United States Patent
Westerberg et al.

(10) Patent No.: US 12,209,520 B2
(45) Date of Patent: Jan. 28, 2025

(54) CONTROL DEVICE AND METHOD FOR CONTROLLING AN EXHAUST GAS AFTERTREATMENT SYSTEM

(71) Applicant: Scania CV AB, Södertälje (SE)

(72) Inventors: Björn Westerberg, Södertälje (SE); Ulf Nylén, Rönninge (SE); Astrid Simovits, Stockholm (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 18/273,582

(22) PCT Filed: Jan. 20, 2022

(86) PCT No.: PCT/SE2022/050059
§ 371 (c)(1),
(2) Date: Jul. 21, 2023

(87) PCT Pub. No.: WO2022/164366
PCT Pub. Date: Aug. 4, 2022

(65) Prior Publication Data
US 2024/0151171 A1    May 9, 2024

(30) Foreign Application Priority Data
Jan. 28, 2021    (SE) .................................. 2150097-0

(51) Int. Cl.
*F01N 3/035*    (2006.01)
*F01N 3/08*     (2006.01)
(Continued)

(52) U.S. Cl.
CPC ............. *F01N 3/035* (2013.01); *F01N 3/108* (2013.01); *F01N 3/208* (2013.01); *F01N 9/007* (2013.01);
(Continued)

(58) Field of Classification Search
CPC combination set(s) only.
See application file for complete search history.

(56) References Cited

U.S. PATENT DOCUMENTS

2008/0124264 A1* 5/2008 Ikeda .................... B01J 37/0248
                                                    502/333
2009/0019831 A1* 1/2009 Heibel .................... F01N 3/021
                                                    60/274
(Continued)

FOREIGN PATENT DOCUMENTS

| EP | 2505803 A2 | 10/2012 |
|----|------------|---------|
| WO | 2014016616 A1 | 1/2014 |
| WO | 2020071981 A1 | 4/2020 |

OTHER PUBLICATIONS

Scania CV AB, International Patent Application No. PCT/SE2022/050059, International Preliminary Report on Patentability, Jul. 31, 2023.
(Continued)

*Primary Examiner* — Binh Q Tran
(74) *Attorney, Agent, or Firm* — Moore & Van Allen PLLC; W. Kevin Ransom

(57) ABSTRACT

A control device and a method for controlling an exhaust gas aftertreatment system comprising a diesel particulate filter is provided. The method comprises a step of, in response to a determination that a temperature of an exhaust gas entering the diesel particulate filter is equal to or below 325° C., controlling a NOx concentration of the exhaust gas entering the diesel particulate filter to be equal to or less than 600 ppm. An exhaust gas aftertreatment system as well as a vehicle comprising the control device are also described.

16 Claims, 3 Drawing Sheets

(51) Int. Cl.
*F01N 3/10* (2006.01)
*F01N 3/20* (2006.01)
*F01N 9/00* (2006.01)
*F01N 11/00* (2006.01)

(52) U.S. Cl.
CPC ............ *F01N 3/0814* (2013.01); *F01N 9/005* (2013.01); *F01N 11/002* (2013.01); *F01N 2230/02* (2013.01); *F01N 2550/04* (2013.01); *F01N 2560/06* (2013.01); *F01N 2900/1402* (2013.01); *F01N 2900/1404* (2013.01); *F01N 2900/1614* (2013.01); *F01N 2900/1626* (2013.01)

(56) References Cited

U.S. PATENT DOCUMENTS

| | | | |
|---|---|---|---|
| 2010/0180579 A1* | 7/2010 | Huang | F01N 3/2066 60/299 |
| 2010/0242447 A1 | 9/2010 | Jasinkiewicz | |
| 2012/0060477 A1 | 3/2012 | Alm et al. | |
| 2012/0214663 A1* | 8/2012 | Chigapov | B01J 35/19 502/73 |
| 2014/0286828 A1* | 9/2014 | Umemoto | F01N 3/0842 422/109 |
| 2014/0363358 A1 | 12/2014 | Udd et al. | |
| 2017/0096921 A1 | 4/2017 | Lutz et al. | |
| 2018/0221819 A1 | 8/2018 | Nilsson et al. | |
| 2018/0221820 A1* | 8/2018 | Nilsson | F01N 3/0231 |
| 2018/0291783 A1* | 10/2018 | Smith | F01N 3/208 |
| 2019/0383186 A1 | 12/2019 | Dou et al. | |
| 2020/0332691 A1* | 10/2020 | Soeger | F01N 3/208 |

OTHER PUBLICATIONS

Scania CV AB, International Patent Application No. PCT/SE2022/050059, International Search Report, Feb. 16, 2022.
Scania CV AB, International Patent Application No. PCT/SE2022/050059, Written Opinion, Feb. 16, 2022.
Scania CV AB, Swedish Patent Application No. 2150097-0, Office Action, Jun. 22, 2021.
Scania CV AB, European Patent Application No. 22746347.8, Extended European Search Report, Sep. 26, 2024.

* cited by examiner

CONTROL DEVICE AND METHOD FOR CONTROLLING AN EXHAUST GAS AFTERTREATMENT SYSTEM

CROSS-REFERENCE TO RELATED APPLICATIONS

This application is a National Stage Patent Application (filed under 35 § U.S.C. 371) of PCT/SE2022/050059, filed Jan. 20, 2022, of the same title, which, in turn claims priority to Swedish Patent Application No. 2150097-0 filed Jan. 28, 2021, of the same title; the contents of each of which are hereby incorporated by reference.

TECHNICAL FIELD

The present disclosure relates in general to a method for controlling an exhaust gas aftertreatment system comprising a diesel particulate filter. The present disclosure further relates in general to a control device configured to control an exhaust gas aftertreatment system comprising a diesel particulate filter. Moreover, the present disclosure relates in general to a computer program and a computer-readable medium. Furthermore, the present disclosure relates in general to a vehicle.

BACKGROUND

An exhaust gas aftertreatment system, such as an exhaust gas aftertreatment system of a vehicle, may comprise various catalysts and filters configured to treat the exhaust gas so as to arrive at a desired tailpipe composition. The tailpipe is released into the surrounding environment and must thus fulfil the requirements of current legislation, or other standards, regarding emissions. Such legislation or standards typically specify maximum levels for a number of tailpipe pollutants including carbon monoxide (CO), hydrocarbons (HC), nitrogen oxides (NOx) and particulate matter (PM). NOx primarily comprises $NO_2$ and NO.

An exhaust gas aftertreatment system of a vehicle may for example comprise a diesel oxidation catalyst (DOC), a diesel particulate filter (DPF), a selective catalytic reduction (SCR) catalyst, and/or an ammonia slip catalyst (ASC). Furthermore, for example exhaust gas recirculation (EGR) may also be used to reduce NOx emissions.

A diesel particulate filter (DPF) accumulates particulate matter during operation and must therefore be regenerated regularly to remove any combustible particulate matter, such combustible particulate matter primarily consisting of soot. There are two different technologies for regeneration of a DPF, namely active regeneration and passive regeneration. Active regeneration may be performed by temporarily increasing the temperature of the exhaust gases (typically to at least about 600° C.), causing an oxidation of the soot by oxygen and thereby removal of the soot from the DPF. In contrast, passive regeneration is a process wherein $NO_2$ is used for substantially continuously oxidizing the soot at normal operating temperatures of the DPF. $NO_2$ constitutes a part of the NOx of the exhaust gas. While $NO_2$ is an efficient oxidant for the soot, the NO of the NOx may instead inhibit the DPF and therefore lead to lower oxidation rates for the soot. For this reason, a DPF may often be coated with a catalyst configured to oxidize NO to $NO_2$. Such a DPF is often called a catalytic diesel particulate filter, cDPF.

WO 2014/016616 A1 discloses one example of a method for controlling an exhaust gas aftertreatment system, wherein the exhaust gas aftertreatment system comprises a first SCR device, a second SCR device arranged downstream of the first SCR device, and a DPF located between the first SCR device and the second SCR device. The operating temperature range of the first SCR device is different to the operating temperature range of the second SCR device. According to said method, the first SCR is dosed with reductant when the temperature of the first SCR is within its operating range, and the second SCR is dosed with reductant when the temperature of the second SCR is within its operating range. When the DPF should be passively regenerated, dosing of the first SCR device is reduced or stopped in order to allow NOx in the exhaust gas stream to pass through the first SCR device and regenerate the DPF. The remaining NOx which exit the DPF may then be removed by the second SCR device, provided that second SCR is within its operating range. In case the DPF should be actively regenerated, the dosing of the SCRs may be continued as normal taking into account the temperatures of the SCRs.

SUMMARY

The object of the present invention is to use passive regeneration of a diesel particulate filer of an exhaust gas aftertreatment system more efficiently.

The object is achieved by the subject-matter of the appended independent claim(s).

In accordance with the present disclosure, a method for controlling an exhaust gas aftertreatment system comprising a diesel particulate filter is provided. The method is performed by a control device. The method comprises a step of, in response to a determination that a temperature of an exhaust gas entering the diesel particulate filter is equal to or below 325° C., controlling a NOx concentration of the exhaust gas entering the diesel particulate filter to be equal to or less than 600 ppm.

Adequate passive regeneration of the DPF inter alia avoids the build-up of a too high back pressure in the exhaust gas aftertreatment system, which in turn may increase fuel consumption of a combustion engine connected to the exhaust gas aftertreatment system. Furthermore, an efficient passive regeneration of a DPF significantly reduces the need for active regeneration of the DPF, which is beneficial since active regeneration often comes with a fuel penalty and may generally temporarily increase the tailpipe emissions. By means of the present method, the diesel particulate filter will be passively regenerated without sacrificing the ability to reach a desired tailpipe composition of the exhaust gases. More specifically, according to the present method, the NOx concentration is, when the exhaust gas temperature is equal to or below 325° C., reduced to a lower concentration upstream of the DPF than what is generally considered to be required for passive regeneration of the DPF. This also facilitates the ability to reach a desired tailpipe composition. This is due to minimizing the risk of high tailpipe emissions during regeneration of the DPF resulting from the conventionally used high NOx concentration into the DPF.

The step of controlling the NOx concentration of the exhaust gas entering the diesel particulate filter may further comprise controlling the NOx concentration to be at least 200 ppm. This further improves the passive regeneration of the DPF.

The exhaust gas aftertreatment system may comprise a first selective catalytic reduction catalyst arranged upstream of the diesel particulate filter. In such a case, the step of controlling the NOx concentration of the exhaust gas entering the diesel particulate filter may comprise controlling a dosage of a reducing agent to the first selective catalytic catalyst. Thereby, the NOx concentration may be efficiently and accurately controlled. This further ensures that a robust exhaust gas aftertreatment system is achieved and which may be operated over a relatively large temperature range.

The exhaust gas aftertreatment system may comprise a second selective catalytic reduction catalyst arranged downstream of the diesel particulate filter. Thereby, the NOx concentration downstream of the DPF may be efficiently reduced.

In case the exhaust gas aftertreatment system comprises a second selective catalytic reduction catalyst arranged downstream of the diesel particulate filter, the method may further comprise controlling a dosage of a reducing agent to the second selective catalytic reduction catalyst based on a desired maximum threshold tailpipe NOx concentration. Thereby, ultra-low tailpipe NOx emissions may be achieved.

The method may further comprise a step of, in response to a determination that the temperature of the exhaust gas entering the diesel particulate filter has increased to a temperature of equal to or above 350° C., controlling a NOx concentration of the exhaust gas entering the diesel particulate filter to be higher than 600 ppm. Thereby, the exhaust gas aftertreatment system may be operated within a large temperature range, if desired, and still achieve a very good passive regeneration of the DPF. More specifically, the passive regeneration may be further increased after the exhaust gas aftertreatment system has been operated at relatively low exhaust gas temperatures.

The present disclosure further relates to a computer program comprising instructions which, when executed by a control device, cause the control device to carry out the method as described above.

The present disclosure further relates to a computer-readable medium comprising instructions which, when executed by a control device, cause the control device to carry out the method as described above.

Moreover, in accordance with the present disclosure, a control device configured to control an exhaust gas aftertreatment system, said exhaust gas aftertreatment system comprising a diesel particulate filter, is provided. The control device is configured to, in response to a determination that a temperature of an exhaust gas entering the diesel particulate filter is equal to or below 325° C., controlling a NOx concentration of the exhaust gas entering the diesel particulate filter to be equal to or less than 600 ppm.

The control device has the same advantages as described above with regard to the corresponding method for controlling an exhaust gas aftertreatment system comprising a diesel particulate filter.

The control device may be configured to control the NOx concentration of the exhaust gas entering the diesel particulate filter to be at least 200 ppm.

The exhaust gas aftertreatment system may further comprise a first selective catalytic reduction catalyst arranged upstream of the diesel particulate filter. In such a case, the control device may be configured to control the NOx concentration of the exhaust gas entering the diesel particulate filter by controlling a dosage of a reducing agent to the first selective catalytic reduction catalyst.

The exhaust gas aftertreatment system may comprise a second selective catalytic reduction catalyst arranged downstream of the diesel particulate filter. In such a case, the control device may further be configured to control a dosage of a reducing agent to the second selective catalytic reduction catalyst based on a desired maximum threshold tailpipe NOx concentration.

The control device may further be configured to, in response to a determination that the temperature of the exhaust gas entering the diesel particulate filter has increased to a temperature of equal to or above 350° C., control the NOx concentration of the exhaust gas entering the diesel particulate filter to be higher than 600 ppm.

Moreover, an exhaust gas aftertreatment system is provided. The exhaust gas aftertreatment system comprises a diesel particulate filter and the control device as described above.

The present disclosure further relates to a vehicle comprising the control device as described above.

DETAILED DESCRIPTION

Figure 1:
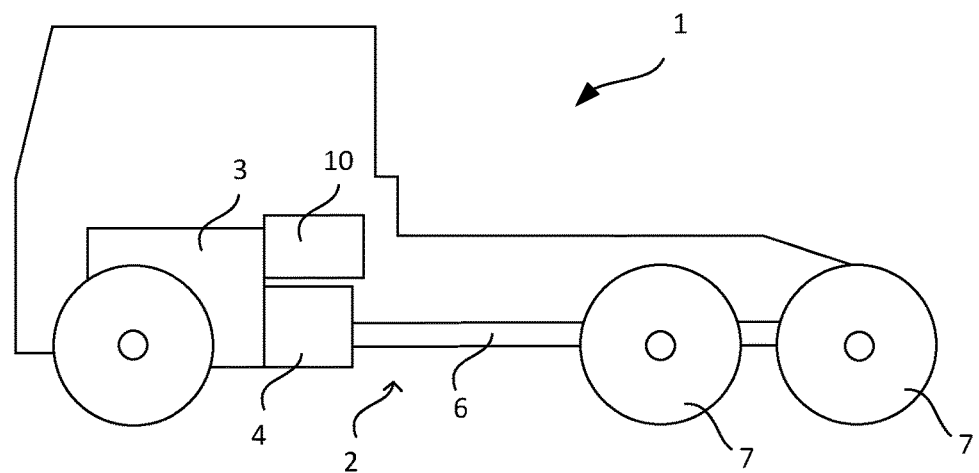
FIG. 1 schematically illustrates a side view of a vehicle.

The invention will be described in more detail below with reference to exemplifying embodiments and the accompanying drawings. The invention is however not limited to the exemplifying embodiments discussed and/or shown in the drawings, but may be varied within the scope of the appended claims. Furthermore, the drawings shall not be considered drawn to scale as some features may be exaggerated in order to more clearly illustrate the invention or features thereof.

When the terms "upstream" and "downstream", respectively, are used in the present disclosure, they shall be considered to be in relation to a direction of flow of exhaust gas through the exhaust gas aftertreatment system.

Moreover, the term "tailpipe" shall in the present disclosure be considered to mean the exhaust gas expelled from the exhaust gas aftertreatment system. The tailpipe is thus the exhaust gas let out from the exhaust gas aftertreatment system to the surrounding environment.

In accordance with the present disclosure, a method for controlling an exhaust gas aftertreatment system, said exhaust gas aftertreatment system comprising a diesel particulate filter (DPF), is provided. The method is performed by a control device configured therefore. More specifically, the present disclosure relates to a method for controlling the exhaust gas aftertreatment system for the purpose of passively regenerating the diesel particulate filter (DPF). In a DPF, soot from the exhaust gas, which is treated in the exhaust gas aftertreatment system, is accumulated. This soot must be removed on a regular basis in order not to build up too high backpressure, which in turn for example may lead to additional fuel expenses in case the exhaust gas aftertreatment system is used for treating exhaust gases of a combustion engine.

A DPF may be passively regenerated by oxidation of the soot by means of $NO_2$ of the NOx present in the exhaust gas entering the DPF. $NO_2$ is a very efficient oxidant for this purpose, and it is generally accepted in the art that the ability to passively generate the DPF increases with increasing amount of NOx in the exhaust gas entering the DPF. The present inventors have however found that this is not accurate for all operating conditions of an exhaust gas aftertreatment system comprising a DPF. More specifically, the present inventors have found that at lower temperatures, the ability to passively regenerate a DPF may in fact decrease with higher NOx concentrations.

Therefore, the present method for controlling an exhaust gas aftertreatment system comprising a DPF, comprises a step of, in response to a determination that a temperature of an exhaust gas entering the diesel particulate filter is equal to or below 325° C., controlling a NOx concentration of the exhaust gas entering the DPF to be equal to or less than 600 ppm. In other words, the present method comprises a step of, in response to a determination that the temperature of the exhaust gas entering the diesel particulate filter is equal to or below 325° C., reducing the NOx concentration upstream of the DPF such that the NOx concentration of the exhaust gas, when entering the DPF, is equal to or less than 600 ppm. According to one embodiment of the method, the step of controlling a NOx concentration of the exhaust gas entering the DPF to be equal to or less than 600 ppm is performed in response to a determination that the temperature of the exhaust gas entering the diesel particulate filter is equal to or below 300° C.

The fact that the NOx concentration of the exhaust gas entering the DPF is, in response to a determination that the temperature of the exhaust gas is equal to or below 325° C. (or 300° C.), controlled to be equal to or less than 600 ppm means that the NOx concentration is reduced to a lower concentration upstream of the DPF than what is conventionally used. Such a relatively large reduction of the NOx concentration upstream of the DPF is in contrast to the conventional strategy of using relatively high NOx concentrations for passively regenerating the DPF, based on the generally accepted knowledge in the art that the ability to passively regenerate the DPF increases with increasing amount of NOx.

Although the NOx concentration is reduced to 600 ppm or less in response to the determination of the temperature of the exhaust gas entering the DPF being 325° (or 300° C.) or less, the passive regeneration of the DPF requires some presence of $NO_2$ and the NOx concentration of the exhaust gas entering the DPF should therefore not be reduced too much. For said reason, the step of controlling the NOx concentration of the exhaust gas entering the DPF may suitably be performed so as to control the NOx concentration to be equal to or above 200 ppm. Preferably, the NOx concentration of the exhaust gas entering the DPF is controlled to be equal to or above 300 ppm.

As mentioned above, the exhaust gas aftertreatment system comprises a DPF. The DPF may preferably be a catalytic DPF (cDPF). In other words, the DPF may suitably be catalytically coated by a catalyst. Thereby, the risk of NO of the NOx inhibiting the passive regeneration in the DPF is reduced. The catalytic coating may preferably comprise or consist of platinum (Pt). Platinum has the ability to oxidize NO to $NO_2$ by means of $O_2$ at a high conversion degree within a large temperature range. According to one alternative, the catalytic coating may comprise platinum (Pt) and palladium (Pd). Other catalytic elements or compounds, such as Ru, Rh, Ir and/or Cu, may also be used in the catalytic coating, if desired.

The method may comprise a step of monitoring the temperature of the exhaust gas entering the DPF. This step may be performed in accordance with any previously known technique therefore. For example, the temperature may be monitored by using one or more temperature sensors arranged immediately upstream of the DPF. Alternatively, the temperature of the exhaust gas entering the DPF may be monitored using a temperature model of the exhaust gas aftertreatment system taking into account a temperature measured elsewhere in the exhaust gas aftertreatment system and/or an operational condition of a combustion engine connected to the exhaust gas aftertreatment system. The method may further comprise a step of determining whether or not the temperature of the exhaust gas entering the DPF is equal to or below 325° C. (or 300° C.).

In case the temperature of the exhaust gas entering the DPF is above 325° C., the exhaust gas treatment system may, if desired, be controlled in accordance with conventional strategies therefore in order to reach a desired tailpipe composition while also allowing a passive regeneration of the DPF. In some cases, this may comprise actively controlling the NOx concentration upstream of the DPF. In other cases, such a strategy may comprise not actively reducing the NOx concentration upstream of the DPF. In the latter case, the NOx concentration may simply be reduced downstream of the DPF in order to reach the desired tailpipe composition. At exhaust gas temperatures of about 350° C. or above, the ability to oxidize the soot in the DPF generally increases with increasing amount of NOx in the exhaust gas. Thus, higher concentrations of NOx than when the temperature of the exhaust gas entering the DPF is 325° C. or less may be appropriate. It should however be noted that passive regeneration of the DPF may occur also at relatively low NOx concentrations, although at a considerably lower rate. Therefore, the NOx concentration of the exhaust gas entering the DPF should be at least 300 ppm, preferably at least 600 ppm, when the temperature of the exhaust gas is above 325° C.

Therefore, the method according to the present disclosure may comprise a step of, in response to a determination that the temperature of the exhaust gas entering the diesel particulate filter has increased from a temperature of 325° C. or less to a temperature of 350° C. or above, controlling the NOx concentration of the exhaust gas entering the diesel particulate filter to be higher than in the previous step when the exhaust gas temperature was 325° C. or less. In particular, the method may comprise a step of in response to a determination that the temperature of the exhaust gas entering the diesel particulate filter has increased to a temperature of equal to or above 350° C., controlling a NOx concentration of the exhaust gas entering the diesel particulate filter to be higher than 600 ppm.

The step of, in response to a determination that a temperature of an exhaust gas entering the DPF is equal to or below 325° C., controlling the NOx concentration of the exhaust gas entering the DPF to 600 ppm or less may be performed by any previously known method therefore, and depends on the configuration (e.g. the arrangement of catalysts) of the exhaust gas aftertreatment system. For example, the control of the NOX concentration in the exhaust gas upstream of the DPF, in response to the determination that the temperature of exhaust gas entering the DPF is equal to or below 325° C., may be performed by means of exhaust gas recirculation (EGR), NOx absorbers, and/or a selective catalytic reduction (SCR) catalyst.

According to one example, the exhaust gas aftertreatment system comprises a SCR catalyst upstream of the DPF. By means of controlling the dosage of a reducing agent to the SCR arranged upstream of the DPF, a desired NOx concentration of the exhaust gas entering the DPF may achieved. Thus, the present method may comprise a step of controlling the NOx concentration of the exhaust gas entering the diesel particulate filter by controlling a dosage of a reducing agent to a first SCR arranged upstream of the DPF.

According to one alternative, the exhaust gas aftertreatment system may comprise two SCRs arranged in parallel and upstream of the DPF. By means of two parallel SCRs, the exhaust gas flow may, when desired, be divided into two partial flows, or the whole exhaust gas flow may be lead via one of the parallel SCRs or the other one of the parallel SCRs. The two partial flows may then be recombined before passing the DPF. It should here be noted that parallel SCRs are not considered to be limited to the SCRs being physically arranged in parallel to each other in the exhaust gas aftertreatment system, but is simply intended to mean that they are arranged such that the exhaust gas flow can be divided between them simultaneously, as opposed to two SCRs arranged in sequence in the direction of flow of exhaust gas through the system. In case the exhaust gas aftertreatment comprises two parallel SCRs, these SCRs may for example have different operating temperature ranges. Thereby, depending on the temperature of the exhaust gas upstream of the SCRs, the exhaust gas may be lead via an SCR having the appropriate operating temperature range.

The method may further comprise a step of controlling the exhaust gas aftertreatment system so as to arrive at a desired tailpipe composition. More specifically, the method may comprise a step of controlling the degree of conversion of gas components in the exhaust gas and/or constituent components of the exhaust gas aftertreatment system downstream of the DPF so as to arrive at a desired tailpipe composition. For example, the exhaust gas aftertreatment system may comprise an SCR arranged downstream of the DPF. The SCR arranged downstream of the DPF may be operated so as to arrive at a desired NOx concentration in the tailpipe. The reduction of NOx in the SCR may be controlled by controlling the dosage of the reducing agent. Thus, the method may further comprise a step of controlling a dosage of a reducing agent to a SCR, arranged downstream of the DPF, based on a desired maximum threshold tailpipe NOx concentration. Such a maximum threshold tailpipe NOx concentration may for example be selected so as to at least meet the current legislation regarding tailpipe emissions.

According to one alternative, the exhaust gas aftertreatment system comprises both a SCR arranged upstream of the DPF and a SCR arranged downstream of the DPF. In such a system, there may generally be a conflict in simultaneously reaching low NOx tailpipe emissions and providing DPF passive generation conditions. If the upstream SCR is used too intensely, the DPF regeneration capacity may be too small. On the other hand, if the upstream SCR is used too modestly, a target tailpipe NOx emission may not be reached. Fulfilling these two requirements may present a difficult optimization problem. A suboptimal handling may therefore require a larger SCR catalyst volume downstream of the DPF, which implies higher cost for the exhaust gas aftertreatment system and may also lead to loss of fuel efficiency of a combustion engine connected to the exhaust gas aftertreatment system due to higher back pressure. However, by means of the present method, the upstream SCR may, at certain temperatures, be used to a higher degree than what is generally considered to be possible for passive regeneration of the DPF. Thereby, the conflict between reaching a target tailpipe NOx emission and passive regeneration of the DPF is removed. This may in turn lead to a more robust aftertreatment system for challenging duty cycles with low-to-mid temperature boundaries.

If desired, the exhaust gas aftertreatment system may further comprise for example an ammonia slip catalyst (ASC) arranged downstream of the DPF and an SCR. The ASC may typically be configured to convert any excess of the reducing agent leaving the SCR to $N_2$ and water. The exhaust gas aftertreatment system may also comprise further catalysts and/or filters, as known in the art, if desired.

The performance of the method for controlling an exhaust gas aftertreatment system as described herein may be governed by programmed instructions. These programmed instructions typically take the form of a computer program which, when executed in or by a control device, causes the control device to effect desired forms of control action. Such instructions may typically be stored on a computer-readable medium.

The present disclosure further relates to a control device configured to control an exhaust gas aftertreatment system in accordance with the method described above. The control device may be configured to perform any one of the steps of the method for controlling an exhaust gas aftertreatment system as described herein.

More specifically, a control device is configured to control an exhaust gas aftertreatment system comprising a diesel particulate filter (DPF). The control device is configured to, in response to a determination that a temperature of an exhaust gas entering the DPF is equal to or below 325° C., controlling a NOx concentration of the exhaust gas entering the diesel particulate filter to be equal to or less than 600 ppm.

The control device may further be configured to monitor the temperature of the exhaust gas entering the DPF and determine whether the temperature of the exhaust gas entering the DPF is equal to or below 325° C. Alternatively, the control device may be configured to receive information from another device configured to determine whether or not the temperature of the exhaust gas entering the DPF is equal to or below 325° C.

The control device may be configured to control the NOx concentration of the exhaust gas entering the diesel particulate filter to be equal to or higher than 200 ppm, preferably equal to or higher than 300 ppm. The control device may be configured to perform said control in response to the determination that a temperature of an exhaust gas entering the DPF is equal to or below 325° C. Alternatively, or additionally, the control device may be configured to control the NOx concentration of the exhaust gas entering the diesel particulate filter to be equal to or higher than 200 ppm at any time that there is a desire to passively regenerate the diesel particulate filter. This may in practice mean that the control device may be configured to control the NOx concentration to be at least 200 ppm when the exhaust gas aftertreatment system is in operation.

In case the exhaust gas aftertreatment system comprises a selective catalytic reduction catalyst (SCR) arranged upstream of the DPF, the control device may be configured to perform the control of the NOx concentration of the exhaust gas entering the DPF by controlling the dosage of reducing agent to said SCR. The control device may be configured to control the dosage of the reducing agent to said SCR also in dependence of temperature and NOx concentration of the exhaust gas upstream of said SCR.

The control device may be further configured to control the exhaust gas aftertreatment system so as to arrive at a desired tailpipe composition. More specifically, the control device may be configured to control the degree of conversion of gas components in the exhaust gas and/or the operation of constituent components of the exhaust gas aftertreatment system downstream of the DPF so as to arrive at a desired tailpipe composition. By way of example, the control device may be configured to control a dosage of a reducing agent to a SCR arranged downstream of the DPF based on a desired maximum threshold tailpipe NOx concentration.

The control device may be a part of an exhaust gas aftertreatment system comprising a DPF, or may be remote from such an exhaust gas aftertreatment system but configured to communicate therewith. The control device may be arranged in a vehicle, such as a heavy vehicle. Parts of the control device may however be arranged remote from the vehicle, if desired, such as at a remote control center or the like. The vehicle may further comprise a combustion engine, such as a diesel engine, and an exhaust gas aftertreatment system configured to treat the exhaust gases generated by the combustion engine.

FIG. 1 schematically illustrates a side view of an example of a vehicle 1. The vehicle 1 comprises a powertrain 2 comprising an internal combustion engine 3 and a gearbox 4. A clutch (not shown) may be arranged between the internal combustion engine 3 and the gearbox 4. The gearbox 4 is connected to the driving wheels 7 of the vehicle 1 via an output shaft 6 of the gearbox 4. The vehicle 1 further comprises an exhaust gas aftertreatment system 10. The vehicle 1 may optionally be a hybrid vehicle, in which case the vehicle comprises an electrical machine (not shown) in addition to the combustion engine 3. The vehicle 1 may be a heavy vehicle, such as a bus or a truck.

Figure 2:
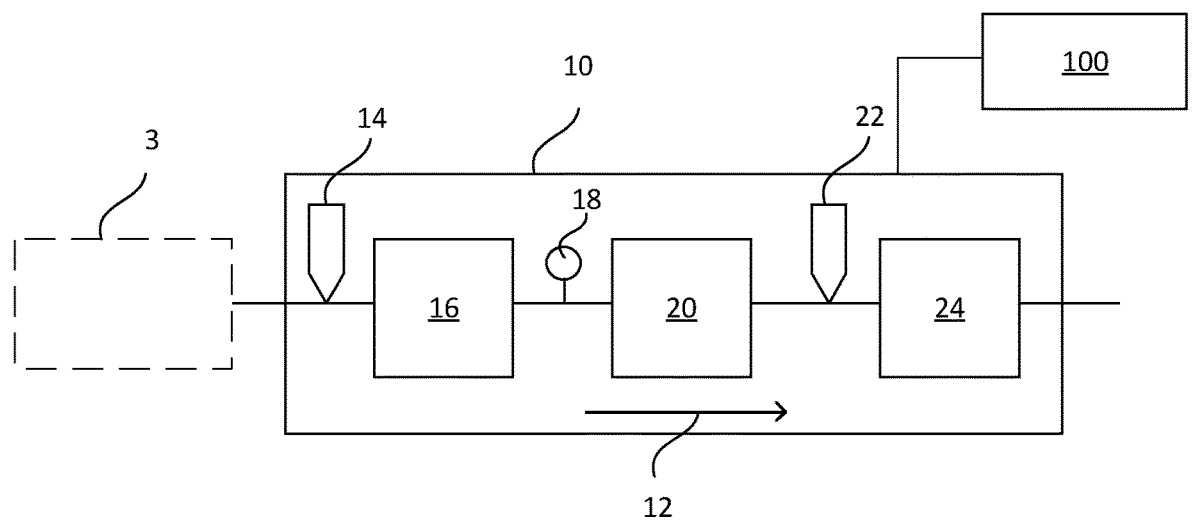
FIG. 2 schematically illustrates one exemplifying embodiment of an exhaust gas aftertreatment system.

FIG. 2 schematically illustrates one exemplifying embodiment of an exhaust gas aftertreatment system 10, which may be controlled in accordance with the method described herein. The exhaust gas aftertreatment system 10 may be configured to treat exhaust gas generated by a combustion engine 3 of a vehicle, such as the vehicle 1 illustrated in FIG. 1, and may thus be connected to a combustion engine 3. The flow of exhaust gas through the exhaust gas aftertreatment system 10 is illustrated by the arrow 12. The exhaust gas aftertreatment system 10 comprises a diesel particulate filter 20, DPF. The DPF 20 may suitably be a catalytic diesel particulate filter, cDPF. The DPF is configured for passive generation thereof.

The exhaust gas aftertreatment system 10 may further comprise a first selective catalytic reduction catalyst 16, SCR, arranged upstream of the DPF 20. A SCR is configured to convert NOx into $N_2$ and water, and thereby reduce the NOx concentration in the exhaust gas. For said purpose, a reducing agent is injected into the exhaust gas upstream of the SCR. The reducing agent may be typically be an aqueous ammonia or urea solution. For the purpose of injecting the reducing agent upstream of the first SCR 16, the exhaust gas aftertreatment system 10 may comprise a first dosing device 14 configured to introduce said reducing agent into the exhaust gas stream. By means of controlling the dosage of the reducing agent, the amount of reduction of NOx in the SCR may be controlled. The dosage of the reducing agent may further be performed in dependence of a temperature of the exhaust gas entering the SCR as well as the concentration of NOx in the exhaust gas entering the SCR. Controlling a dosage of an SCR to arrive at a desired reduction of NOx concentration is as such well known to a person skilled in the art and will therefore not be further described in the present disclosure.

The exhaust gas aftertreatment system 10 may further comprise a second selective catalytic reduction catalyst 24 arranged downstream of the DPF 20. Furthermore, the exhaust gas aftertreatment system 10 may comprise a second dosing device 22 configured to introduce a reducing agent into the exhaust gas stream upstream of the second SCR 22.

The exhaust gas aftertreatment system 10 may further comprise various sensors as known in the art, such as temperature sensors and/or NOx sensors. Such sensors may be used to determine various parameters needed for a desired control of the exhaust gas aftertreatment system to arrive at a desired tailpipe composition. Such sensors may also be used for control of a specific constituent component of the exhaust gas aftertreatment system, if desired. By way of example, the exhaust gas treatment system may comprise a temperature sensor 18 configured to determine the temperature of the exhaust gas entering the DPF 20, as illustrated in FIG. 2. Said temperature sensor 18 may be arranged immediately upstream of the DPF 20. With the use of the temperature sensor 18, it may for example be determined whether the temperature of the exhaust gas entering the DPF 20 is equal to or below 325°

The exhaust gas aftertreatment system may be controlled by a control device 100 configured therefore. The control device 100 may be a part of exhaust gas aftertreatment system as such, but may also be any other control device of a system or arrangement in which the exhaust gas aftertreatment is comprised, such as a vehicle. The control device 100 may comprise one or more control units. In case of the control device comprising a plurality of control units, each control unit may be configured to control a certain function or a certain function may be divided between more than one control units. By way of example only, the control device may comprise a first control unit configured to monitor the temperature of the exhaust gas entering the DPF and a second control unit configured to control the NOx concentration of the exhaust gas entering the DPF.

It should be noted that although FIG. 2 illustrates an exhaust gas aftertreatment system 10 comprising two SCRs, 16 and 24, with a DPF 20 arranged in-between the SCRs, the present disclosure is not limited to such an exhaust gas aftertreatment system. In fact, the present method may be performed in any exhaust gas aftertreatment system comprising a DPF (which may be passively regenerated) as long as there is also a possibility for controlling the NOx concentration in the exhaust gas upstream of the DPF. Such a control of the NOx concentration may for example be performed by means of exhaust gas recirculation (EGR), NOx absorbers, and/or, as mentioned above, selective catalytic reduction (SCR). An exhaust gas aftertreatment comprising two SCRs with a DPF arranged in-between the SCRs, such as illustrated in FIG. 2, however has certain advantages. For example, it enables an improved NOx conversion after start of the combustion engine since the upstream SCR may be heated more quickly, and therefore become operative sooner than for example an SCR arranged downstream of a DPF.

Figure 3:
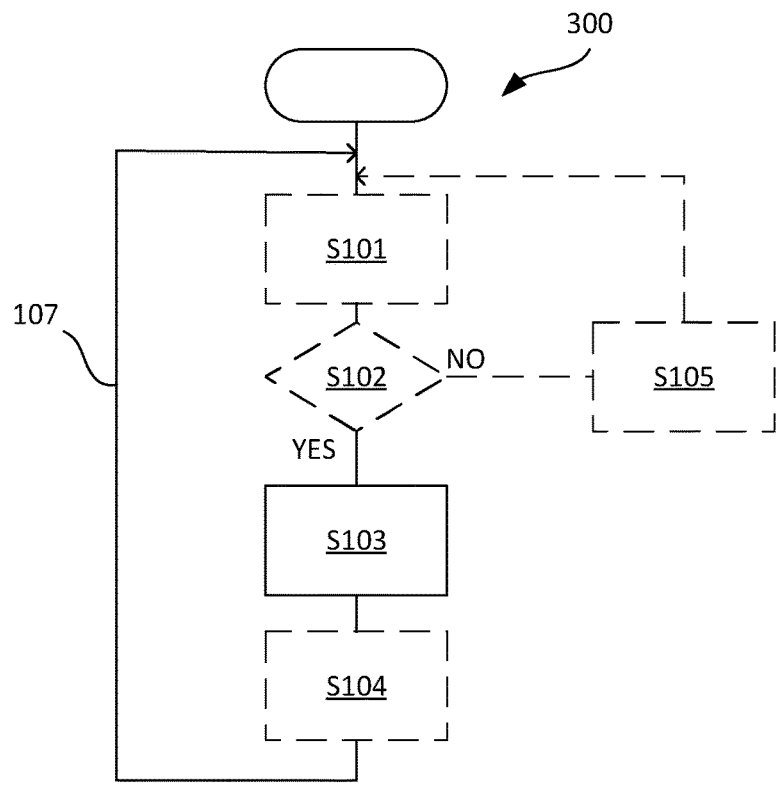
FIG. 3 represents a flowchart schematically illustrating a method for controlling an exhaust gas aftertreatment system in accordance with one exemplifying embodiment of the present disclosure, FIG. 4 schematically illustrates a device that may constitute, comprise or be a part of a control device configured to control an exhaust gas aftertreatment system.

FIG. 3 represents a flowchart schematically illustrating a method 300 for controlling an exhaust gas aftertreatment system in accordance with one exemplifying embodiment of the present disclosure. The exhaust gas aftertreatment system, controlled by the method 300, comprises a DPF and may for example have the configuration described above with regard to the exemplifying embodiment shown in FIG. 2. The method may comprise a step S101 of monitoring the temperature of the exhaust gas entering the DPF. The step S101 may for example be performed by measuring the temperature directly, immediately upstream of the DPF, using a temperature sensor, such as temperature sensor 18 shown in FIG. 2. Alternatively, the temperature of the exhaust gas entering the DPF may be derived via a modelling of the exhaust gas aftertreatment system taking into consideration a temperature measured elsewhere in the exhaust gas aftertreatment system and/or an operational condition of a combustion engine connected to the exhaust gas aftertreatment system. The method may further comprise a step S102 of determining whether the temperature of the exhaust gas entering the DPF is equal to or below 325° C.

The method 300 comprises a step S103 of, in response to a determination that the temperature of the exhaust gas entering the DPF is equal to or below 325° C., controlling a NOx concentration of the exhaust gas entering the DPF to be equal to or less than 600 ppm. Step 103 may comprise controlling the NOx concentration of the exhaust gas entering the DPF to be within the range of 200-600 ppm, preferably 300-600 ppm. In case the exhaust gas aftertreatment system comprises a SCR arranged upstream of the DPF, step S103 may be executed by controlling a dosage of a reducing agent to the SCR so as to arrive at the desired NOx concentration.

The method may further comprise a step S104 of controlling any constituent component or operating parameter(s) of the exhaust gas aftertreatment system, downstream of the DPF, so as to arrive at desired tailpipe composition.

In case it is determined that the temperature of the exhaust gas entering the DPF is not 325° C. or less, the method 300 may after step 102 be reverted back to step S101. Alternatively, the method may proceed to a step S105 of controlling the NOx concentration of the exhaust gas entering the DPF to be at least 300 ppm, preferably above 600 ppm. After step S105, the method 300 may be reverted back to step S101.

The method 300 may be performed continuously or intermittently (such as at predetermined intervals), and is thus after step S103 and the possible step S104 reverted back to start as illustrated by arrow 107.

Figure 4:
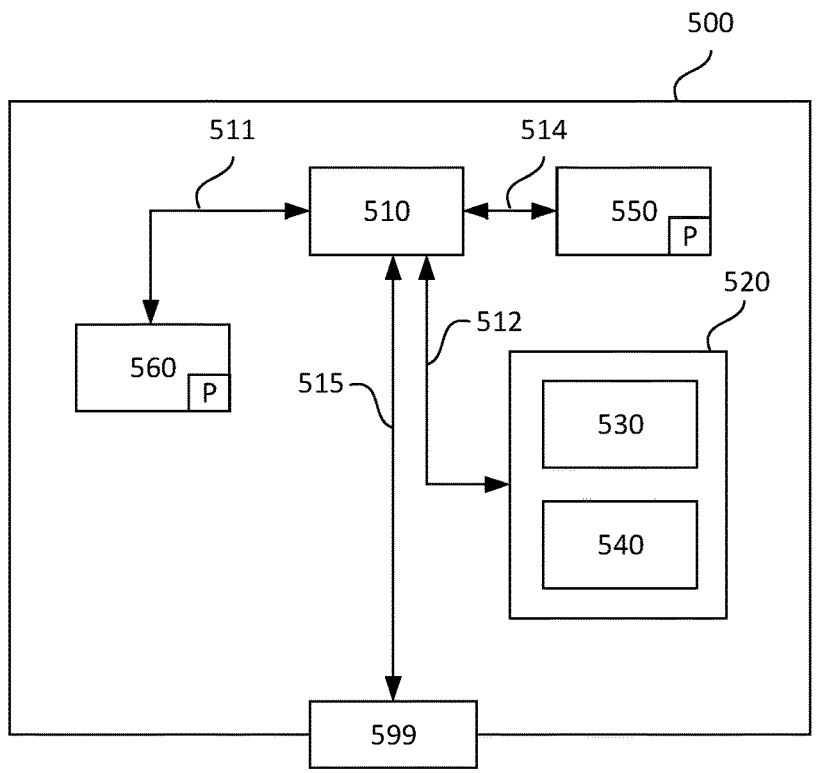

FIG. 4 schematically illustrates an exemplifying embodiment of a device 500. The control device 100 described above may for example comprise the device 500, consist of the device 500, or be comprised in the device 500.

The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P that comprises instructions for controlling an exhaust gas aftertreatment system, said exhaust gas aftertreatment system comprising a diesel particulate filter. The computer program comprises instructions for, in response to a determination that a temperature of an exhaust gas entering the diesel particulate filter is equal to or below 325° C., controlling a NOx concentration of the exhaust gas entering the diesel particulate filter to be equal to or less than 600 ppm.

The program P may be stored in an executable form or in a compressed form in a memory 560 and/or in a read/write memory 550.

The data processing unit 510 may perform one or more functions, i.e. the data processing unit 510 may effect a certain part of the program P stored in the memory 560 or a certain part of the program P stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicate with the data processing unit 510 via a data bus 514. The communication between the constituent components may be implemented by a communication link. A communication link may be a physical connection such as an optoelectronic communication line, or a non-physical connection such as a wireless connection, e.g. a radio link or microwave link.

When data are received on the data port 599, they may be stored temporarily in the second memory element 540. When input data received have been temporarily stored, the data processing unit 510 is prepared to effect code execution as described above.

Parts of the methods herein described may be effected by the device 500 by means of the data processing unit 510 which runs the program stored in the memory 560 or the read/write memory 550. When the device 500 runs the program, methods herein described are executed.

For the purpose of demonstrating the effect of the method as described herein, experimental tests were performed to investigate the soot oxidation rate in a cDPF (the catalytic coating essentially consisting of Pt). The soot oxidation rate was monitored as produced $CO_2$. For all the tests, the gas mixture used for the test comprised 6% $O_2$ and 5% $H_2O$, and a space velocity of 25 000 $h^{-1}$ was used. A concentration of NO as well as the temperature of the gas were varied. Since the NO is inherently oxidized in the cDPF to $NO_2$, the NO concentration may be considered to correspond to the NOx concentration of an exhaust gas under operation of an exhaust gas aftertreatment system comprising the cDPF.

Figure 5A:
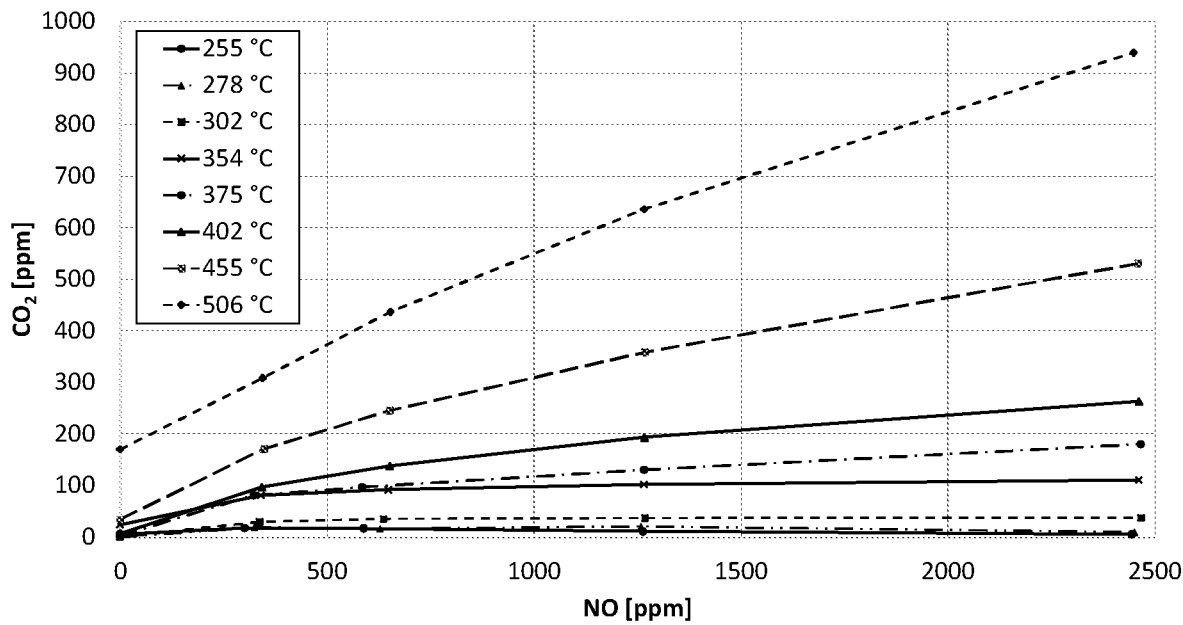
FIG. 5a illustrates produced CO 2 on a cDPF as a function of NO concentration at various temperatures from 255° C. to 506° C.
Figure 5B:
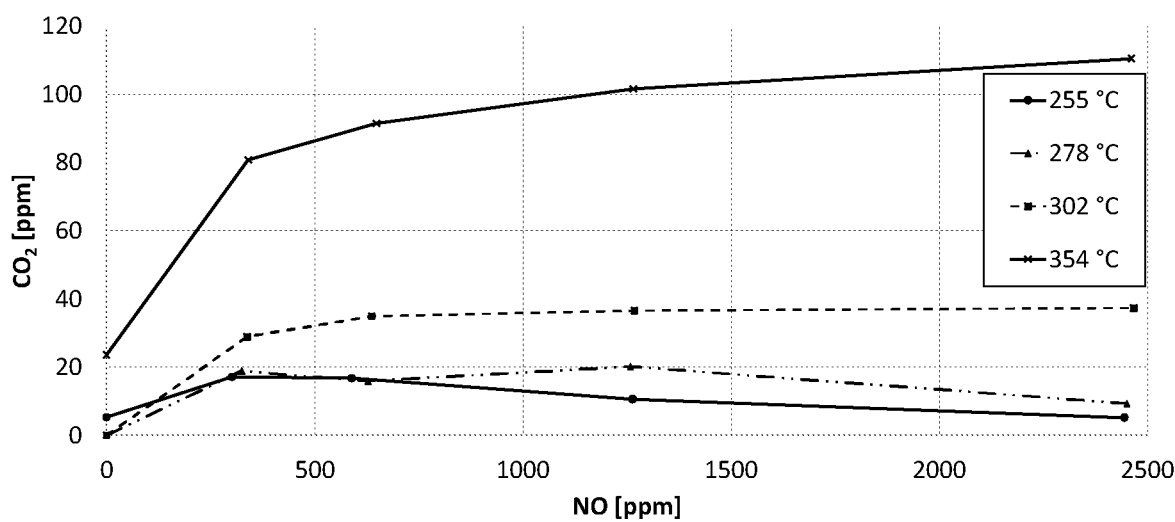
FIG. 5b represents a more detailed view of the result of FIG. 5a showing produced CO 2 as a function of NO concentration at the temperatures from 255° C. to 354° C.

FIG. 5a illustrates produced $CO_2$ as a function of NO concentration at various temperatures from 255° C. to 506° C. FIG. 5b illustrates produced $CO_2$ as a function of NO concentration at various temperatures from 255° C. to 354° C. FIG. 5b thus represents a more detailed view of some of the test results shown in FIG. 5a.

As seen in FIG. 5a, the soot oxidation rate increases with increasing NO concentration at the higher temperatures tested. However, as seen in FIG. 5b, the soot oxidation rate actually decreases with increasing NO concentration at temperatures below about 300° C. when the NO concentration is above 600 ppm. This indicates that there is a maximum NOx concentration that shall not be exceeded when the temperature of the exhaust gas is below 300° C. At a temperature of about 300° C., there is no gain in regeneration performance when increasing the NO above 600 ppm. At about 350° C., there is a slight increase in regeneration performance when increasing the NO concentration above 600 ppm.

It is also interesting to note that at all the tested temperatures up to about 350° C., most of the regeneration performance is obtained already at a NO concentration of 300 ppm. This indicates that it is possible to have a very high reduction of NOx upstream of the DPF when the temperature of the exhaust gas is about 300° C. or less, while still achieve a good passive regeneration of the DPF. Thereby, it would for example in an exhaust gas aftertreatment system comprising a first SCR arranged upstream and a second SCR arranged downstream of the SCR be possible to have a smaller catalyst volume of the second SCR to provide the desired conversion of NOx to arrive at a desired tailpipe composition. A smaller second SCR reduces the costs for the SCR as such as well as improved fuel economy of a vehicle due to lower back pressure.

The invention claimed is:

1. A method, performed by a control device, for controlling an exhaust gas aftertreatment system comprising a diesel particulate filter,
the method comprising a step of:
in response to a determination that a temperature of an exhaust gas entering the diesel particulate filter is equal to or below 325°° C., controlling a NOx concentration of the exhaust gas entering the diesel particulate filter to be at least 200 ppm and equal to or less than 600 ppm.

2. The method according to claim 1, wherein the exhaust gas aftertreatment system comprises a first selective catalytic reduction catalyst arranged upstream of the diesel particulate filter, and
wherein the step of controlling the NOx concentration of the exhaust gas entering the diesel particulate filter comprises controlling a dosage of a reducing agent to the first selective catalytic reduction catalyst.

3. The method according to claim 1, wherein the exhaust gas aftertreatment system further comprises a second selective catalytic reduction catalyst arranged downstream of the diesel particulate filter.

4. The method according to claim 3, further comprising controlling a dosage of a reducing agent to the second selective catalytic reduction catalyst based on a desired maximum threshold tailpipe NOx concentration.

5. The method according to claim 1, further comprising a step of:
in response to a determination that the temperature of the exhaust gas entering the diesel particulate filter has increased to a temperature of equal to or above 350° C., controlling a NOx concentration of the exhaust gas entering the diesel particulate filter to be higher than 600 ppm.

6. A computer program product comprising computer program code stored on a non-transitory computer-readable medium, said computer program code configured for controlling an exhaust gas aftertreatment system comprising a diesel particulate filter, said computer program code comprising instructions which, when executed by a control device, cause the control device to perform the following operation:
in response to a determination that a temperature of an exhaust gas entering the diesel particulate filter is equal to or below 325° C., controlling a NOx concentration of the exhaust gas entering the diesel particulate filter to be at least 200 ppm and equal to or less than 600 ppm.

7. A control device configured to control an exhaust gas aftertreatment system, the exhaust gas aftertreatment system comprising a diesel particulate filter,
wherein the control device is configured to, in response to a determination that a temperature of an exhaust gas entering the diesel particulate filter is equal to or below 325° C., controlling a NOx concentration of the exhaust gas entering the diesel particulate filter to be at least 200 ppm and equal to or less than 600 ppm.

8. The control device according to claim 7, wherein the exhaust gas aftertreatment system further comprises a first selective catalytic reduction catalyst arranged upstream of the diesel particulate filter, and
wherein the control device is configured to control the NOx concentration of the exhaust gas entering the diesel particulate filter by controlling a dosage of a reducing agent to the first selective catalytic reduction catalyst.

9. The control device according to claim 7, wherein the exhaust gas aftertreatment system further comprises a second selective catalytic reduction catalyst arranged downstream of the diesel particulate filter, and
wherein the control device is further configured to control a dosage of a reducing agent to the second selective catalytic reduction catalyst based on a desired maximum threshold tailpipe NOx concentration.

10. The control device according to claim 7, wherein the control device is further configured to, in response to a determination that the temperature of the exhaust gas entering the diesel particulate filter has increased to a temperature of equal to or above 350° C., control the NOx concentration of the exhaust gas entering the diesel particulate filter to be higher than 600 ppm.

11. An exhaust gas aftertreatment system comprising a diesel particulate filter and a control device, wherein the control device is configured to, in response to a determination that a temperature of an exhaust gas entering the diesel particulate filter is equal to or below 325° C., controlling a NOx concentration of the exhaust gas entering the diesel particulate filter to be at least 200 ppm and equal to or less than 600 ppm.

12. A vehicle comprising the control device configured to control an exhaust gas aftertreatment system, the exhaust gas aftertreatment system comprising a diesel particulate filter,
wherein the control device is configured to, in response to a determination that a temperature of an exhaust gas entering the diesel particulate filter is equal to or below 325° C., controlling a NOx concentration of the exhaust gas entering the diesel particulate filter to be at least 200 ppm and equal to or less than 600 ppm.

13. The computer program product according to claim 6, wherein the exhaust gas aftertreatment system comprises a first selective catalytic reduction catalyst arranged upstream of the diesel particulate filter, and
wherein controlling the NOx concentration of the exhaust gas entering the diesel particulate filter comprises controlling a dosage of a reducing agent to the first selective catalytic reduction catalyst.

14. The computer program product according to claim 6, wherein the exhaust gas aftertreatment system further comprises a second selective catalytic reduction catalyst arranged downstream of the diesel particulate filter.

15. The computer program product according to claim 6, further comprising instructions which, when executed by a control device, cause the control device to control a dosage of a reducing agent to the second selective catalytic reduction catalyst based on a desired maximum threshold tailpipe NOx concentration.

16. The computer program product according to claim 6, further comprising instructions which, when executed by a control device, cause the control device to:
in response to a determination that the temperature of the exhaust gas entering the diesel particulate filter has increased to a temperature of equal to or above 350° C., controlling a NOx concentration of the exhaust gas entering the diesel particulate filter to be higher than 600 ppm.

* * * * *